United States Patent
Takada (10) Patent No.: US 10,644,273 B2
(45) Date of Patent: May 5, 2020

(54) SECONDARY BATTERY METAL TERMINAL COATING RESIN FILM, METHOD FOR MANUFACTURING SAME AND BATTERY PACK

(71) Applicant: Toppan Printing Co., Ltd., Taito-ku, Tokyo (JP)

(72) Inventor: Takehisa Takada, Taito-ku (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 234 days.

(21) Appl. No.: 14/790,990

(22) Filed: Jul. 2, 2015

(65) Prior Publication Data

US 2015/0311483 A1    Oct. 29, 2015

Related U.S. Application Data

(63) Continuation of application No. PCT/JP2013/007701, filed on Dec. 27, 2013.

(30) Foreign Application Priority Data

Jan. 7, 2013    (JP) ................... 2013-000638

(51) Int. Cl.
| | |
|---|---|
| *H01M 2/08* | (2006.01) |
| *B29C 48/92* | (2019.01) |
| *H01M 2/30* | (2006.01) |
| *B29C 48/03* | (2019.01) |
| *B32B 27/32* | (2006.01) |
| *B32B 7/02* | (2019.01) |

(Continued)

(52) U.S. Cl.
CPC .............. *H01M 2/08* (2013.01); *B29C 48/03* (2019.02); *B29C 48/92* (2019.02); *B29C 55/28* (2013.01);

(Continued)

(58) Field of Classification Search
CPC ...................................................... H01M 2/08
See application file for complete search history.

(56) References Cited

U.S. PATENT DOCUMENTS

2008/0254360 A1* 10/2008 Miyazawa ............ H01M 2/021
                                                                429/184
2013/0130007 A1    5/2013 Orihara et al.

FOREIGN PATENT DOCUMENTS

| JP | H06-136330 A | 5/1994 |
| JP | 2002-245988 A | 8/2002 |

(Continued)

OTHER PUBLICATIONS

First Office Action issued in Chinese Patent Application No. 201380069123.4 dated Nov. 22, 2016.

(Continued)

*Primary Examiner* — Ula C Ruddock
*Assistant Examiner* — Thomas H. Parsons
(74) *Attorney, Agent, or Firm* — Foley & Lardner LLP (57) ABSTRACT

A secondary battery metal terminal coating resin film having improved overall performance and capable of securing filling ability, adhesive properties, insulating properties of a lead end portion and shape retention properties of a sealant, a manufacturing method for the same and a battery pack using the secondary battery metal terminal coating resin film in provided in the lead end portion of a tab used for a laminate-type packaging material for a secondary battery. The secondary battery metal terminal coating resin film (24) according to the present invention is laminated, coating metal terminal (26) connected to a positive electrode or a negative electrode of a secondary battery. The melt flow rate of at least one layer of a resin that constitutes the resin film (24) is within a range from about 0.1 g/10 minutes to about 2.5 g/10 minutes.

2 Claims, 2 Drawing Sheets

(51) Int. Cl.
  *B29C 55/28* (2006.01)
  *B29C 48/00* (2019.01)
  *H01M 10/0525* (2010.01)
  *B29L 9/00* (2006.01)
  *B29K 23/00* (2006.01)
  *B29L 31/34* (2006.01)

(52) U.S. Cl.
  CPC ............... *B32B 7/02* (2013.01); *B32B 27/32* (2013.01); *H01M 2/305* (2013.01); *B29C 48/0018* (2019.02); *B29C 2948/92647* (2019.02); *B29C 2948/92695* (2019.02); *B29C 2948/92876* (2019.02); *B29C 2948/92942* (2019.02); *B29K 2023/06* (2013.01); *B29K 2023/12* (2013.01); *B29L 2009/00* (2013.01); *B29L 2009/003* (2013.01); *B29L 2031/3468* (2013.01); *B29L 2031/3481* (2013.01); *B32B 2457/10* (2013.01); *H01M 10/0525* (2013.01)

(56) References Cited

FOREIGN PATENT DOCUMENTS

| | | | |
|---|---|---|---|
| JP | 2002245988 | * | 8/2002 |
| JP | 2003-007264 A | | 1/2003 |
| JP | 2003-007268 A | | 1/2003 |
| JP | 2004-362935 A | | 12/2004 |
| JP | 2009-224218 A | | 10/2009 |
| JP | 04-498639 B2 | | 4/2010 |
| JP | 2011-103245 A | | 5/2011 |
| JP | 2012-022821 A | | 2/2012 |
| JP | 04-993054 B2 | | 5/2012 |
| JP | 2012-238454 A | | 12/2012 |
| JP | 2012238454 | * | 12/2012 |
| WO | WO 2012/020721 A1 | | 2/2012 |
| WO | WO-2012/063764 A1 | | 5/2012 |

OTHER PUBLICATIONS

International Search Report dated Feb. 18, 2014 issued in Application No. PCT/JP2013/007701.
Office Action dated Apr. 18, 2017 in Japanese Patent Application No. 2013-000638.
Japanese Patent Opposition dated Aug. 9, 2018 in a corresponding application.
Official Communication issued in corresponding Japanese Patent Application No. 2013-000638 dated Jun. 28, 2017.

* cited by examiner

SECONDARY BATTERY METAL TERMINAL COATING RESIN FILM, METHOD FOR MANUFACTURING SAME AND BATTERY PACK

CROSS REFERENCE TO RELATED APPLICATIONS

This application is a continuation application filed under 35 U.S.C. 111(a) claiming the benefit under 35 U.S.C. §§ 120 and 365(c) of PCT International Application No. PCT/JP2013/007701 filed on Dec. 27, 2013, which is based upon and claims the benefit of priority of Japanese Application No. 2013-000638 filed on Jan. 7, 2013, the entire contents of which are hereby incorporated by reference in their entireties.

TECHNICAL FIELD

The present invention relates to a secondary battery metal terminal coating resin film, a method for manufacturing the same and a battery pack using the secondary battery metal terminal coating resin film, the film having improved shape retention properties and adhesive properties when it is heated and being capable of securing insulation properties.

BACKGROUND ART

In conventionally used aqueous batteries, such as nickel hydrogen batteries and lead acid batteries, because of a restriction of the electrolyte voltage of water, voltage per cell unit has been limited to approximately 1.2 volts maximum. In recent years, there have been demands for portable equipment to be shrunk and natural energy power generation to be effectively utilized, so the necessity of using lithium ion batteries that are capable of handling higher voltage and having high energy density is increased. As packing material used for such lithium ion batteries, conventionally, metal cans have been used. However, considering a demand of thinner products and various requirements, a laminate packing material in which a resin film is laminated on an aluminum foil that has low cost when forming bag-like shapes has come to be used.

Figure 1:
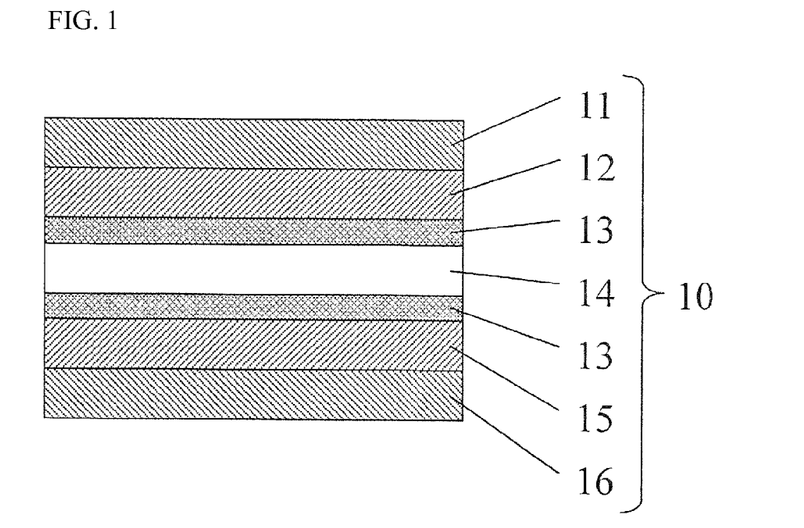
FIG. 1 is a cross-sectional view schematically showing a structure of a laminate-type packaging material used for lithium ion battery.
Figure 2:
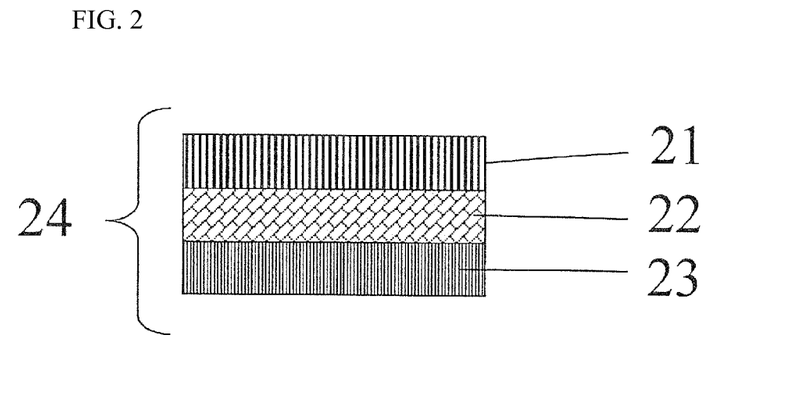
FIG. 2 is a cross-sectional view schematically showing a structure of three-layer tab sealant.
Figure 3A:
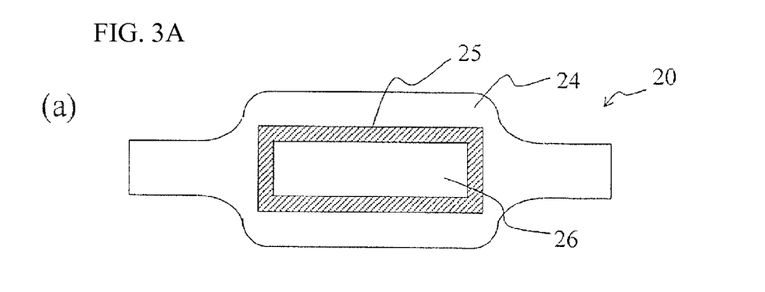
FIG. 3A is a cross-sectional schematically showing a general structure of a tab.
Figure 3B:
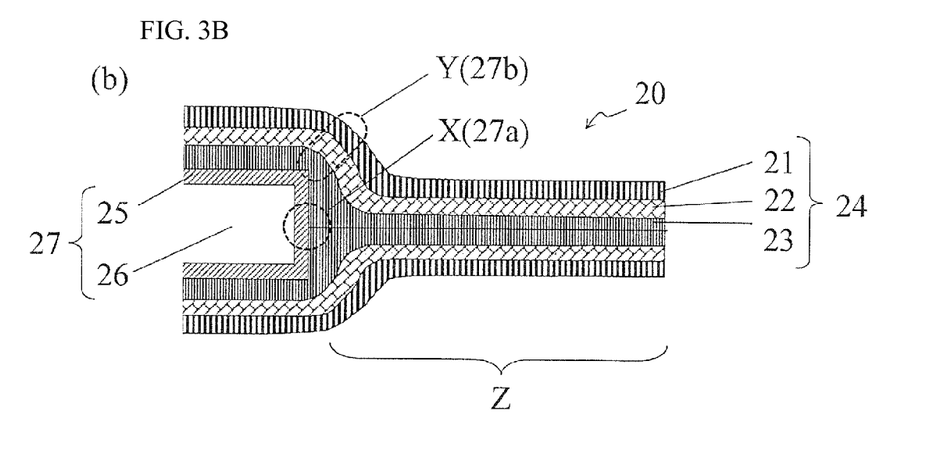
FIG. 3B is a cross-sectional view schematically showing a detailed structure of the tab.

The secondary battery laminate packing material (hereinafter referred to as packing material) 10 is a laminate body constituted of metal foil and resin. As shown in FIG. 1, the packing material 10 is constituted by, in order, generally, an inner layer, an inner resin layer 11, an inner adhesive layer 12, a corrosion prevention processed layer 13, a barrier layer 14, a corrosion prevention processed layer 13, an outer adhesive layer 15 and an outer layer 16. As for the barrier layer 14, aluminum or stainless steel are used. As for the outer layer 16, a single layer film such as nylon or PET (polyethylene terephthalate) or a multilayer film is used. An electrode terminal which is called tab is required in order to supply power from the lithium ion battery constituted by the packing material 10. FIGS. 3A and 3B are cross-sectional views schematically illustrating the structure of the tab 20. The tab 20 is constituted by a metal terminal (hereinafter also referred to as a lead) 27 and a metal terminal coating resin film (hereinafter also referred to as a sealant) 24.

Aluminum is used for the lead 27 of the positive electrode and a corrosion prevention surface processing is often performed on the surface thereof. As a result of the corrosion prevention surface processing, an anticorrosion protective layer 25 is formed on the surface of the lead 27. Meanwhile, nickel or copper is used for the negative electrode of the lead 27. A single layer or multilayer resin film is generally used for the sealant 24. Since the sealant 24 is a member disposed between the lead 27 and the packing material 10, mainly the following three properties are required. The first one is having adhesive properties to both the lead 27 and the inner resin (resin that forms inner resin layer 11). Regarding adhesion to the lead 27, polypropylene or polyethylene which is a polyolefin resin used for the sealant 24 is acid-modified and a polar group is provided to enhance the adhesive properties.

Further, as shown at portion X in FIG. 3B, when the sealant 24 is welded to the lead 27, the end portion 27a of the lead 27 has to be filled up with melted sealant resin. If the filling is not sufficient, the lead 27 and the sealant 24 are not adhered. Hence, leakage of liquid or peeling may occur when the battery is manufactured. To enhance filling ability of the sealant 24 filling to the end portion 27a of the lead, it is important to make the MFR (melt flow rate) of the sealant resin larger so as to allow the sealant resin to easily flow when welding. For the above-described inner resin, a polyolefin type resin such as polypropylene or polyethylene is generally used. Therefore, polyolefin type resin can be used for the above-described sealant resin so as to obtain improved adhesive properties.

The second one is securing insulating properties. Since the lead 27 is a terminal from which current from the battery is acquired, insulation with other members should be maintained. In the tab member, a portion most concerned with insulation properties is, as shown at portion Y in FIG. 3B, a shoulder portion 27b of the lead 27. The lead shoulder portion 27b may break through the sealant 24 when there is a burr on the lead 27 so that the film thickness of the sealant 24 may become too thin if the pressure and temperature conditions are severe when the lead 27 and the sealant 24 are welded. Therefore, film thickness of the sealant resin of this portion (i.e., lead shoulder portion 27b) is most likely to become thin so that the insulation properties are likely to decrease. To solve the above-described problems, it is necessary to make it hard for the resin to flow when welding by using resin having a low MFR.

The third one is that a shape maintainability of the sealant 24. As shown at portion Z in FIG. 3B, the tab 20 has a portion constituted by only sealant resin. In this portion, depending on conditions of heating/cooling at the welding, undulation/bending may occur or sagging down due to the own weight after the welding (with cured while being deformed).

To try to obtain the above properties, a three-layer configuration using layers having different MFRs is proposed according to patent literatures 1 and 2 (as identified below). When welding, a highly fluidized bed that enables resin to easily flow and a low fluidized bed that makes it hard for resin to flow are laminated, whereby properties of the resin to wraparound towards the lead end portion 27a and insulation properties by maintaining the film thickness of the lead shoulder portion 27b are obtained. However, for the use of large capacitive batteries representing a vehicle-use or a storage battery, the film thickness of the lead 27 is likely to increase. Hence, a requirement for filling ability of the sealant 24 becomes more demanding. Moreover, these large batteries have large capacities so that the requirements of the insulation properties become demanding. Therefore, according to the configurations of the patent literatures 1 or 2, the performance thereof is not sufficient.

CITATION LIST

[Patent Literature 1]: Japanese Patent No. 4498639
[Patent Literature 2]: Japanese Patent No. 4993054

SUMMARY OF THE INVENTION

Technical Problem

The present invention has been achieved in light of the above-described circumstances and an object is to provide a secondary battery metal terminal coating resin film having improved overall performance and being capable of securing filling ability, adhesive properties, insulating properties of a lead end portion and shape retention properties of a sealant, a manufacturing method for the same and a battery pack using the secondary battery metal terminal coating resin film.

Solution to Problem

An aspect of the present invention to try to solve the above-described issues is a secondary battery metal terminal coating resin film being laminated, coating a metal terminal connected to a positive electrode or a negative electrode of a secondary battery. The secondary battery metal terminal coating resin film is characterized in that a melt flow rate of at least one layer of a resin that constitutes the resin film is within a range from about 0.1 g/10 minutes to about 2.5 g/10 minutes.

According to the above-described secondary battery metal terminal coating resin film, at least one layer having the MFR within a range from about 0.1 g/10 minutes to about 2.5 g/10 minutes is provided. Hence, the resin is unlikely to flow when welding and the insulation properties can be maintained.

An another aspect of the present invention is a secondary battery metal terminal coating resin film being laminated, coating a metal terminal connected to a positive electrode or a negative electrode of a secondary battery. The secondary battery metal terminal coating resin film is characterized in that in a case where the resin film is constituted by three layers including a core layer as an intermediate layer of the resin film and skin layers as other layers of the resin film, a difference of a melt flow rate between the core layer and the skin layers is within a range from about 5 g/10 minutes to about 30 g/10 minutes.

According to the above-described secondary battery metal terminal coating resin film, since a difference of the MFR between the core layer and the skin layers is within a range from about 5 g/10 minutes to about 30 g/10 minutes, properties of the core layer and the skin layers can be differentiated, and it is possible to secure the insulation properties of the core layer and wraparound properties of the resin by the skin layers.

An other aspect of the present invention is a secondary battery metal terminal coating resin film being laminated, coating a metal terminal connected to a positive electrode or a negative electrode of a secondary battery. The secondary battery metal terminal coating resin film is characterized in that in a case where the resin film is constituted by three layers including a core layer as an intermediate layer of the resin film and skin layers as other layers of the resin film, a film thickness of the core layer is within a range from about 20 μm to about 200 μm.

According to the above-described secondary battery metal terminal coating resin film, since the thickness of the core layer is about 20 μm or more, even when being heated by heat sealing or the like when it is welded, the insulation properties can be secured.

Moreover, since the thickness of the core layer is about 200 μm or less, a film thickness can readily be controlled and this can avoid increasing the cost, and also avoid increasing the amount of resin.

Further, in the above-described secondary battery metal terminal coating resin film, at least one layer of the skin layers may be an acid modified polyolefin resin.

According to the above-described secondary battery metal terminal coating resin film, since at least one layer of the skin layers includes an acid modified polyolefin resin, adhesive properties to a metal terminal or other resin can be enhanced.

Moreover, in the above-described secondary battery metal terminal coating resin film, a melt flow rate of at least one layer of a resin that constitutes the resin film may be within a range from about 0.1 g/10 minutes to about 2.5 g/10 minutes.

According to the above-described secondary battery metal terminal coating resin film, at least one layer has an MFR within a range from about 0.1 g/10 minutes to about 2.5 g/10 minutes. Hence, the resin is unlikely to flow when welding and the insulation properties can be maintained.

In the above-described secondary battery metal terminal coating resin film, a difference of a melt flow rate between the core layer and the skin layers may be within a range from about 5 g/10 minutes to about 30 g/10 minutes.

According to the above-described secondary battery metal terminal coating resin film, since a difference of the MFR between the core layer and the skin layers is within a range from about 5 g/10 minutes to about 30 g/10 minutes, properties of the core layer and the skin layers can be differentiated, and it is possible to secure the insulation properties of the core layer, and wraparound properties of the resin by the skin layers.

Also, in the above-described secondary battery metal terminal coating resin film, in a case where the resin film is constituted by three layers including a core layer as an intermediate layer of the resin film and skin layers as other layers of the resin film, a film thickness of the core layer may be within a range from about 20 μm to about 200 μm.

According to the above-described secondary battery metal terminal coating resin film, since the thickness of the core layer is about 20 μm or more, even when being heated by heat sealing or the like when it is welded, the insulation properties can be secured. Moreover, since the thickness of the core layer is about 200 μm or less, film thickness can readily be controlled and this can help to avoid increasing cost, and also help to avoid increasing an amount of resin required.

An another aspect of the present invention is a battery pack characterized in that the battery pack is provided with the above-described secondary battery metal terminal coating resin film.

According to the above-described battery pack, since the above-described secondary battery metal terminal coating resin film is provided, a battery pack having improved insulation properties and adhesive properties can be produced.

Further, another aspect of the present invention is a manufacturing method of the secondary battery metal terminal coating resin film characterized in that secondary battery metal terminal coating resin film is manufactured by inflation molding.

According to the above-described manufacturing method, inflation molding capable of performing extrusion of resin having low MFR is used, whereby the secondary battery metal terminal coating resin film can be stably produced.

Advantageous Effects of Invention

According to an aspect of the present invention, a secondary battery metal terminal coating resin film having improved overall performance and capable of securing filling ability, adhesive properties, insulating properties of a lead end portion and/or shape retention properties of a sealant, a manufacturing method for the same and a battery pack using the secondary battery metal terminal coating resin film can be provided.

DESCRIPTION OF EMBODIMENTS

Hereinafter, a tab 20 according to the embodiment of the present invention is described in detail. FIGS. 3A and 3B are cross-sectional view showing an example of the tab 20. As shown in FIGS. 3A and 3B, the tab 20 is configured such that a sealant 24 which has a three-layer configuration and a lead metal layer 26 are bonded via an anticorrosion protective layer 25. A member including the lead metal layer 26 and the anticorrosion protective layer 25 is referred to as lead 27. The sealant 24 is configured by, in order from a side furthest from the lead 27, a sealant skin layer (hereinafter also simply referred to skin layer) 21, a sealant core layer (hereinafter also simply referred to core layer) 22, a sealant skin layer (hereinafter also simply referred to skin layer) 23.

<Sealant Skin Layer 21, 23>

A resin having improved adhesive properties against the lead 27 and a polyolefin resin is required for the skin layers 21 and 23. As for the skin layers 21 and 23, for example, acid modified polyolefin resin in which polyolefin resin is graft modified with maleic anhydride or the like may preferably be used. As the skin layer 21 that touches the inner resin layer 11 (refer to FIG. 1) of the packaging material 10 and the skin layer 23 that touches the lead 27, different resin can be used. When resin material between the front side and the back side of the sealant 24 are different, physical properties between the front side and the back side of the sealant 24 are different, so that the productivity may be decreased. Therefore, the same resin material may preferably be used for the skin layer 21 and the skin layer 23.

Since the MFR of the core layer 22 is within a range from about 0.1 g/10 min. to about 2.5 g/10 min. and the difference of MFRs between the core layer 22 and the skin layers 21 and 22 is within a range from about 5 g/10 min. to about 30 g/10 min., the MFR of the skin layers 21 and 23 may preferably be within a range from about 5.1 g/10 min. to about 32.5 g/10 min. Regarding the MFR of skin layers 21 and 23, the difference with the core layer 22 is important so that a single value cannot be applied thereto.

Considering the filling ability to the lead end portion 27a, the MFR may preferably be within a range from 7 g/10 min. to 20 g/10 min. When the MFR of the skin layers 21 and 23 is less than 5.1 g/10 min., the lead end portion 27a is not sufficiently filled when it is welding. Moreover, when the MFR of the skin layers 21 and 23 exceeds 32.5 g/10 min., since the viscosity when film is produced is too low, a pin hole may occur.

When the difference of the MFR between the core layer 22 and the skin layers 21 and 23 exceeds 30 g/10 min., the MFR of the skin layers 21 and 23 becomes too large so that resin excessively flows when it is welded, and the welding becomes unstable. Also, when the difference of the MFR between the core layer 22 and the skin layers 21 and 23 is less than about 5 g/10 min., the difference of the MFR is too low. Hence, each of the performance in the core layer 22 and the skin layers 21 and 23 is less effective. The film thickness of the skin layers 21 and 23 may preferably be within a range from about 10 μm to 300 μm. When the film thickness of the skin layers 21 and 23 is less than about 10 μm, an amount of resin that flows so as to fill the lead end portion 27a cannot be secured, causing insufficient filling. Further, when the film thickness of the skin layers 21 and 23 exceeds about 300 μm, thickness control is hard to achieve during extrusion such as inflation molding and the amount of resin required is increased thereby causing an increase of manufacturing cost.

The melting point of the skin layers 21 and 23 may preferably be within a range from 100 degrees C. to 170 degrees C. As for the melting point, the core layer 22 and the inner resin layer 11 of the packaging material 10 should be considered. Therefore, the melting point is hard to determine only by the skin layers 21 and 23. For example, when the core layer 22 and the inner resin layer 11 is formed by polyethylene system resin, the skin layers 21 and 23 may preferably be formed by a similar polyethylene system resin of which the melting point is around 100 degrees C. Further, when the core layer 22 and the inner resin layer 11 are formed by polypropylene system resin, a resin having the melting point ranging from 130 degrees C. to 170 degrees C. may preferably be used.

<Sealant Core Layer 22>

Considering adhesive properties with the skin layers 21 and 23, the core layer 22 may preferably be made from polyolefin resin. As for the MFR of the core 22, it is preferably be within a range from about 0.1 g/10 min. to about 2.5 g/10 min. When the MFR of the core layer 22 is less than about 0.1 g/10 min., the melting viscosity is too low to produce film. Meanwhile, if the MFR of the core layer 22 exceeds about 2.5 g/10 min., when it is welded during a tab being made to perform a heat sealing with the packaging material, it is hard to secure the above-described insulation properties and to maintain the shape. In productivity and the above-described performance point of view, the MFR of the core layer 22 may more preferably be within a range from the about 0.5 g/10 min. to about 1.5 g/10 min.

The film thickness of the core layer 22 may preferably be within a range from about 20 μm to about 200 μm. When the film thickness of the core layer 22 is less than about 20 μm, the film thickness is so thin that it is difficult to weld and maintain the shape when heat sealing is performed. Also, when performing the above-described welding and the heat sealing since the skin layers 21 and 23 have large MFR, the resin moves significantly so that the film thickness of the lead shoulder portion 27b may be lowered. In the lead shoulder portion 27b, the film thickness of the film thickness of the skin layers 21 and 23 may be greatly lowered. Hence, the film thickness of the lead shoulder portion 27b should be secured at the core layer 22. When the film thickness of the core layer 22 is less than about 20 μm, the total thickness of the lead shoulder 27b is lowered so that the insulation properties are decreased. When the film thickness of the core layer 22 exceeds about 200 μm, as similar to the skin layers 21 and 23, thickness control is hard to achieve during extrusion such as an inflation molding and an amount of resin is increased thereby causing an increase of manufacturing cost. Similar to the reason of the skin layers 21 and 23, the melting point of the core layer 22 may preferably be within a range from 100 degrees C. to 170 degrees C. To ensure film thickness of the core layer 22, it is desirable that the core layer 22 has a melting point which is higher than the skin layer 21 and 23.

<Lead 27>

The material depends on material of the collector in the secondary battery. For example, in a lithium ion battery, aluminum is used for collector of the positive electrode. Similarly, as for the lead 27, aluminum may preferably be used for the positive electrode terminal. Specifically, considering anti corrosion properties, for the lead 27, aluminum having 97% or more purity such as 1N30 may preferably be used. Moreover, considering a case where a thermal welding portion between the tab 20 and the packaging material may be bent, annealed aluminum material which is refined by sufficient annealing in order to add flexibility may preferably be used. In the lithium ion battery, copper is used for the collector of the negative electrode. For the negative electrode, untreated copper is unlikely to be used considering anti corrosion properties, so copper with nickel plating or nickel may preferably be used.

As for the film thickness of the lead 27, depending on the size, and the capacity of the battery, a thickness of about 50 μm or more for a small sized battery is used. For on-vehicle use or storage battery use, a thickness of about 100 μm to about 500 μm is used. Since reducing the electrical resistance of the lead 27 is required, it is possible to increase the film thickness of the lead 27. When the thickness of the lead is increased, the thickness of the sealant may preferably be increased. In the sealant 24, the end portions of these large leads have to be filled. Accordingly, it is important that a functional dissociation is performed for the skin layer 21 and 23 like the present embodiment, and the core layer 22, so as to set appropriate film thickness and MFR. Moreover, it is effective that a corrosion prevention processing is performed to the lead 27. In secondary batteries such as a lithium ion battery, the electrolyte solution contains a corrosive component such as $LiPF_6$ (lithium hexafluorophosphate). Hence, a corrosion prevention processing is necessary for the lead 27.

<Manufacturing Method for Sealant 24>

As a manufacturing method of the sealant 24, three layer inflation molding is desirable. As a general extrusion molding, a T-die method or an inflation method is provided. In the T-die method, resin having a small MFR has high difficulty of extrusion. Meanwhile, when the MFR is high, it is hard to maintain bubbles in the inflation method so that pinholes or a breakage may occur on the film. On the other hand, when extrusion is performed with a low MFR, the shape of the bubbles is stable so that the film having less non-uniformity can be formed. Accordingly, as performed in the present embodiment, the inflation method is the best when performing the extrusion of the film including low MFR resin. In a case where the skin layers 21 and 23 are the same type, extrusion molding having 2 types and 3 layers is used.

The temperature of the extrusion may preferably be within a temperature range from 180 degrees C. to 300 degrees C. More preferably, the temperature range may be from 200 degrees C. to 250 degrees C. Since the welding of the resin is insufficient when the temperature of the extrusion is less than 180 degrees C., it is possible that extrusion from the screw becomes unstable because the melting viscosity is too high. Meanwhile, when the temperature of the extrusion exceeds 300 degrees C., oxidation and deterioration become significant, thereby reducing quality of the film. A rotational speed of the screw, a blow ratio and a take-up speed may appropriately be selected with respect to the film thickness being set. The three-layers film thickness ratio can be adjusted by changing respective rotational speed of the screws.

<Welding Method>

The sealant 24 manufactured with the above-described method and the lead 27 are heat-sealed by simultaneously performing a welding of the core layer 22 with applying heat and adherence with pressurization between the sealant 24 and the lead 27. To obtain sufficient peel strength, the heating temperature is required to be larger than temperature at the melting point of the resin of the core layer 22. When temperature difference of the melting points between the core layer 22 and, the skin layer 21 and 23 of the sealant 24 is set, the heating temperature may preferably be set to be lower than or equal to the melting point temperature of the core layer 22 or, the heating temperature may preferably be set to be lower than or equal to the melting point of the resin that constitutes the outer layer 16 of the packaging material 10, when the core layer 22 is not used. Specifically, a temperature approximately from 140 degrees C. to 170 degrees C. is suitable for the heating temperature. It is necessary to determine the heat time and the pressurizing time considering the peeling strength and the productivity. The pressurizing time may preferably be in a range from 1 second to 60 seconds. However, when production tact is prioritized, thermal sealing at a temperature larger than 170 degrees C. for a short period of time can be performed. According to the above-described manufacturing method, a condition using temperature range approximately from 170 degrees C. to 200 degrees C. for about 3 seconds to 20 seconds can be applied.

<Packaging Material>

The packaging material 10 is constituted generally by, in order from the inner layer, the inner resin layer 11, the inner adhesive layer 12, the corrosion prevention processed layer 13, the outer adhesive layer 15 and the outer layer 16. As a component that constitutes the inner resin layer 11, for example, polyolefin resin or acid modified polyolefin resin in which polyolefin resin is graft modified with maleic anhydride or the like can be provided. As a polyolefin resin, for example, polyethylene of low density, middle density and high density; ethylene-alpha-olefin copolymer; homogenized, blocked or random polypropylene; propylene-alpha-olefin copolymer can be provided. For these polyolefin resin, a single type of resin or two or more types of resin may be used.

Moreover, the inner resin layer 11 may be a single layer film or a multilayer film in which a plurality of layers are laminated. Depending on required functions, for example, taking adding moisture proof properties into consideration, a multilayer film in which a resin such as ethylene-cyclic olefin copolymer or polymethylpentene is interposed may be used for the inner resin layer 11. Further, the inner resin layer 11 may contain various addition agent, for example, a flame retardant, a slipping agent, an anti-blocking agent, antioxidant, light stabilizer, or tackifier. The thickness of the inner resin layer 11 may preferably be in a range from about 10 μm to about 150 μm, and more preferably be in a range from about 30 μm to about 80 μm. When the thickness of the inner resin layer 11 is less than about 10 μm, heat sealing adhesive properties between the packaging materials 10 and, adhesive properties with the tab sealant 24 may decrease, and when the thickness of the inner resin layer 11 exceeds about 150 μm, manufacturing cost may increase.

As for the inner adhesive layer 12, publicly known materials such as adhesive for dry laminates or acid-modified heat sealed resins can be used. The corrosion prevention processed layer 13 may preferably be formed, from a performance point of view, on the front surface or the back surface of the barrier layer 14. However, considering manufacturing cost, the corrosion prevention processed layer 13 may be formed on only the single surface side. As a barrier layer 14, for example, aluminum, stainless steel or the like can be used. However, from the manufacturing cost and weight (density) point of view, aluminum may preferably be used. As for the outer layer side adhesive layer 15, for example, a general adhesive such as a poly urethane system containing polyester polyol, polyether polyol and acrylic polyol as major components may be used. As for the outer layer 16, for example, a single film such as nylon or PET, or a multilayer film is used. Similar to the inner resin layer 11, the outer layer 16 may contain various addition agents, for example, a flame retardant, a slipping agent, an anti-blocking agent, antioxidant, light stabilizer, or tackifier. As a measure of liquid leaking, resin which is insoluble to the electrolyte may be laminated or resin component which is insoluble to the electrolyte may be coated.

<Packaging material 10 and Heat Sealing Method>

When the battery pack is produced, the packaging material 10 and the tab (tab lead 27 and tab sealant 24 are adjoined by welding) 20 are heat-sealed. The heat seal at the tab portion requires more heat compared to the heat sealing only for the packaging material because the tab 20 is sandwiched. As a temperature condition of the heat sealing, a temperature range from 160 degrees C. to 210 degrees C. may preferably be used. This is because, when the temperature is less than 160 degrees C., adhesion failure is likely to occur due to insufficient welding of the tab sealant 24 and when the temperature exceeds 210 degrees C., nylon which is generally used for the outer layer 16 of the packaging material 10 may be melted. The heat sealing period may preferably be within a range from 1 second to 10 seconds. When the heat sealing period is less than 1 second, adhesion failure is likely to occur due to insufficient welding. When the heat sealing period is more than 10 seconds, the tact becomes longer so that the productivity is decreased.

Moreover, since the thickness of the tab portion is thicker than that of other portions, for example, spot facing is applied to a heat seal bar which is used when heat sealing is performed, whereby appropriate pressure is applied to a portion being heat sealed with only the tab or the packaging material in the vicinity thereof.

EXAMPLES

Hereinafter, embodiments of the present invention is described, however, it is not limited to these embodiments. The conditions commonly used for the embodiments and the Comparative Examples are described as follows.

(1) Producing Tab 20

A lead 27 having width 5 mm, length 30 mm and thickness 100 μm is employed. Regarding the materials, aluminum is used for the positive electrode and nickel is used for the negative electrode. Non chromium surface treatment is applied for both positive electrode and negative electrode. The composition and the thickness of the sealant 24 are described in detail in the respective embodiments. For the dimensions, a width of 15 mm, and length of 10 mm is used for the sealant 24. The sealant 24, the lead 27 and the sealant 24 are laminated in this order and welding is performed at temperature 150 degrees C. for 10 seconds of welding period.

(2) Producing Battery Pack

As a packaging material 10, from the outer side, nylon (thickness 25 μm), polyester polyol system adhesive (thickness 5 μm), aluminum foil (thickness 40 μm, A8079-annealed aluminum material), acid modified polypropylene (hereinafter also referred to as PPa, thickness 30 μm), and polypropylene (hereinafter also referred to as PP, thickness 40 um) are employed. Non chromium surface treatment is applied for both surfaces of the aluminum foil. The size of the packaging material 10 is set as 50 mm×90 mm and the long side is folded in two. Heat sealing is applied for both positive and negative electrodes at a single side of the side which became the width 45 mm. The heat sealing is performed at a temperature of 190 degrees C. for 5 seconds. The heat sealing for the sides of remaining two portions in which no tabs exists is performed at a temperature of 190 degrees C. for 3 seconds. First, heat sealing is applied to an opposite surface of the folded side. Subsequently, 2 ml of electrolyte in which $LiPF_6$ (lithium hexafluorophosphate) is added to a liquid mixture of diethyl carbonate and ethylene carbonate is filled and the opposite surface of the tab 20 is heat sealed at last. Thus, a battery pack for evaluating the tab 20, in which battery elements such as collectors are not encapsulated is produced.

Example 1

The sealant is produced by inflation extrusion of two types and three layers (hereinafter also referred to as inflation method) using the skin layer A and the skin layer B which are identical. Here, the skin layers A and B correspond to the above-described skin layers 21 and 23. Acid modified polypropylene (PPa) having the melting point 140 degrees C. and MFR 15 g/10 minutes is used for the skin layers A and B and polypropylene (PP) having a melting point of 160 degrees C. and MFR 1.0 g/10 minutes is used. Film forming is performed under a condition in which the melting temperature is 210 degrees C., and the blow ratio is 2.2 so as to produce the total thickness 150 μm having film thicknesses 45/60/45 μm (skin layer A/core layer/skin layer B).

Example 2

The sealant was produced under the same condition as in Example 1 except that PPa having the melting point 140 degrees C. and MFR of 10 g/10 minutes was used for the skin layers A and B and polypropylene (PP) having the melting point 155 degrees C. and MFR 0.7 g/10 minutes was used for the core layer.

Example 3

The sealant was produced with the same condition as the Example 1 except that the total thickness of sealant was 100 μm having film thicknesses 30/40/30 μm (corresponding to skin layer A/core layer/skin layer B).

Example 4

The sealant was produced with the same condition as the Example 2 except that the total thickness of sealant was 100 μm having film thicknesses 30/40/30 μm (corresponding to skin layer A/core layer/skin layer B).

Comparative Example 1

The sealant was produced with the same condition as the Example 4 except that PP having the melting point 160 degrees C. and MFR 7 g/10 minutes was used for the core layer.

Comparative Example 2

The sealant was produced with the same condition as the Example 1 except that PPa having the melting point 135 degrees C. and MFR 2 g/10 minutes was used for the skin layers A and B.

Comparative Example 3

The sealant was produced with the same condition as the Example 1 except that the total thickness of sealant was 50 μm having film thicknesses 15/20/15 μm (corresponding to skin layer A/core layer/skin layer B).

Comparative Example 4

The sealant was produced with the same condition as the Example 2 except that the total thickness of sealant was 50 μm having film thicknesses 15/20/15 μm (corresponding to skin layer A/core layer/skin layer B).

Comparative Example 5

The sealant was produced with the same condition as the Example 1 except that PPa having the melting point 140 degrees C. and MFR 15 g/10 minutes was used for the skin layers A and B.

Comparative Example 6

The sealant was produced with the same condition as the Example 2 except that PPa having the melting point 140 degrees C. and MFR 10 g/10 minutes was used for the skin layers A and B.

Comparative Example 7

The sealant was produced with the same condition as the Example 1 except that a film-forming method of the sealant is changed to a T-die method with a melting temperature at 230 degrees C.

Comparative Example 8

The sealant was produced with the same condition as the Example 2 except that a film-forming method of the sealant is changed to a T-die method with a melting temperature at 230 degrees C.

<Evaluation of Sealant>

Produced tab and battery pack were evaluated by a method described as follows.

<Evaluation 1: Film Forming Properties>

When making film of the sealant, products which were formed without wrinkles and pin holes were regarded as adaptive products.

<Evaluation 2: Shape Stability>

Variation of dimension at the sealant portion of the tab produced as described above was measured. Products within a range +−300 μm with respect to the design value were regarded as adaptive products.

<Evaluation 3: Lead End Portion Filling Ability>

The tab produced as described above was dyed using high permeable dyeing liquid (Micro Check manufactured by Taiho Kohzai Co., LTD). Products in which the liquid was penetrated to the lead end portion and was colored were regarded as non-adaptive products. Products in which a side of the lead was sufficiently filled was regarded as adaptive products.

<Evaluation 4: Adhesive Properties>

An adhesive strength of the sealant of the tab produced as described above and the lead were measured. A measurement is performed using a tension testing machine (manufactured by Shimadzu Corporation) with a peeling angle 180 degrees and a peeling speed 30 mm/min. Products having peeling strength 2.5 N/5 mm or more for both the positive electrode and the negative electrode were regarded as adaptive products.

<Evaluation 5: Insulating Properties>

The insulation properties between the negative electrode lead of the battery pack used for evaluation which was produced as described above and the packaging material was measured by a tester. Among 100 samples, products having less than 10 short failures were regarded as adaptive products.

TABLE 1

| | Type of Resin | | | MFR (g/10 min.) | | | Configuration |
|---|---|---|---|---|---|---|---|
| | Skin layer A | Core layer | Skin layer B | Skin layer A | Core layer | Skin layer B | of film thickness (μm) |
| Example 1 | PPa | PP | PPa | 15 | 1 | 15 | 45/60/45 |
| Example 2 | PPa | PP | PPa | 10 | 0.7 | 10 | 45/60/45 |
| Example 3 | PPa | PP | PPa | 15 | 1 | 15 | 30/40/30 |
| Example 4 | PPa | PP | PPa | 10 | 0.7 | 10 | 30/40/30 |
| Comparative example 1 | PPa | PP | PPa | 10 | 7 | 10 | 30/40/30 |
| Comparative example 2 | PPa | PP | PPa | 2 | 1 | 2 | 45/60/45 |
| Comparative example 3 | PPa | PP | PPa | 15 | 1 | 15 | 15/20/15 |
| Comparative example 4 | PPa | PP | PPa | 10 | 0.7 | 10 | 15/20/15 |
| Comparative example 5 | PP | PP | PP | 15 | 1 | 15 | 45/60/45 |
| Comparative example 6 | PP | PP | PP | 10 | 0.7 | 10 | 45/60/45 |
| Comparative example 7 | PPa | PP | PPa | 15 | 1 | 15 | 45/60/45 |
| Comparative example 8 | PPa | PP | PPa | 10 | 0.7 | 10 | 45/60/45 |

TABLE 1-continued

|  | Method of manufacturing | Film forming properties | Shape stability | Lead end portion filling properties | Adhesive properties | Insulation properties | Comprehensive Result |
|---|---|---|---|---|---|---|---|
| Example 1 | inflation | OK | OK | OK | OK | OK | OK |
| Example 2 | inflation | OK | OK | OK | OK | OK | OK |
| Example 3 | inflation | OK | OK | OK | OK | OK | OK |
| Example 4 | inflation | OK | OK | OK | OK | OK | OK |
| Comparative example 1 | inflation | NG | NG | OK | OK | NG | NG |
| Comparative example 2 | inflation | OK | OK | NG | OK | OK | NG |
| Comparative example 3 | inflation | OK | OK | NG | OK | NG | NG |
| Comparative example 4 | inflation | OK | OK | NG | OK | NG | NG |
| Comparative example 5 | inflation | OK | OK | OK | NG | OK | NG |
| Comparative example 6 | inflation | OK | OK | OK | NG | OK | NG |
| Comparative example 7 | T-dye | NG | N/A | N/A | N/A | N/A | NG |
| Comparative example 8 | T-dye | NG | N/A | N/A | N/A | N/A | NG |

<Evaluation Result>

The evaluation result is shown in Table 1. In table 1, "OK" represents adaptive products, "NG" represents non-adaptive products and N/A represents impossible to measure.

According to the Example 1 to the Example 4, sealants conforming to all items of film forming properties, shape stability, lead end portion filling ability, adhesive properties and insulation properties and having improved shape stability, sufficient filling ability of the lead end portion and having improved adhesive properties and insulation properties were able to be produced stably.

Meanwhile, according to Comparative Example 1, since the MFR of the core layer was too large, the shape stability and the insulation properties were decreased. According to the Comparative Example 2, the MFR of the skin layers A and B were too small, filling ability of the lead end portion was insufficient. According to the Comparative Examples 3 and 4, since the film thickness of the core layer was too thin, the insulation properties were insufficient. According to the Comparative Examples 5 and 6, since PP was used for the skin layers A and B, adhesive properties were insufficient. According to the Comparative Examples 7 and 8, since the film forming was performed with a T-dye method not the inflation method, wrinkles occurred on the film, and an improved film was not able to be produced. From the above results, according to the secondary battery metal terminal coating resin film of the present embodiment, filling ability of the lead end portion, adhesive properties, insulation properties, shape stability of the sealant can be secured, whereby a secondary battery metal terminal coating resin film having improved comprehensive characteristics can be provided.

REFERENCE SIGNS LIST

10: secondary battery laminate packing material
11: inner resin layer
12: inner layer side adhesive layer
13: corrosion prevention processed layer
14: barrier layer
15: outer layer adhesive layer
16: outer layer
20: tab
21: skin layer
22: core layer
23: skin layer
24: sealant
25: anti corrosion protective layer
26: lead metal layer
27: lead
27a: lead end portion
27b: lead shoulder portion
X: end portion of lead
Y: shoulder portion of lead
Z: portion configured by only sealant

What is claimed is:

1. A resin film for coating secondary battery metal terminals, comprising:
  a laminated structure that is capable of coating metal terminals connected to a positive electrode and a negative electrode of a secondary battery,
  wherein the resin film has three layers including a core layer as an intermediate layer of the resin film and skin layers as other layers of the resin film,
  wherein the core layer is sandwiched between the skin layers, and the skin layers are made of a same material,
  wherein a difference of a melt flow rate between the core layer and the skin layers is within a range from about 5 g/10 minutes to about 30 g/10 minutes,
  wherein the melt flow rate of the core layer is within a range from about 0.5 g/10 minutes to about 1.5 g/10 minutes and wherein the melt flow rate of each of the skin layers is within a range from 7 g/10 min to 20 g/10 min;
  wherein a film thickness of the core layer is between 40 µm and 60 µm and a film thickness of each of the skin layers is between 30 µm and 45 µm,
  wherein an anticorrosion protective layer is formed on a surface of a lead of the positive electrode, and
  wherein a surface of each of the positive electrode and the negative electrode is treated with a non-chromium surface treatment, wherein the core layer comprises polypropylene and each of the skin layers comprise acid modified polypropylene and wherein the resin film is manufactured by three-layer inflation molding.

2. A battery pack comprising the resin film for coating secondary battery metal terminals according to claim 1.

* * * * *